Patented May 16, 1933

1,908,715

UNITED STATES PATENT OFFICE

FREDERICK W. MILLER, JR., OF WILMINGTON, DELAWARE, ASSIGNOR TO E. I. DU PONT DE NEMOURS & COMPANY, OF WILMINGTON, DELAWARE, A CORPORATION OF DELAWARE

UREA SYNTHESIS

No Drawing.    Application filed May 28, 1931.    Serial No. 540,821.

This invention relates to the synthesis of urea from ammonia and carbon dioxide, and more particularly to an improved method for the efficient recovery and reutilization of unconverted raw materials.

It is known that when ammonia and carbon dioxide or their compounds (i. e. ammonium carbamate, carbonate, bicarbonate, or mixtures thereof) are heated together in a closed system urea is formed. The conversion to urea is only partial, however, for while various means have been proposed for improving the efficiency of the reaction, in no case is complete conversion attained. The disposition of the unconverted raw material has an important bearing upon the ultimate cost of urea. Various proposals have, therefore, previously been made to develop a self-contained urea process in which the unconverted reactants might be separated from the urea and returned to the synthesis for conversion with fresh portions of reactants.

With a view to overcoming the practical difficulties inherent in the previous proposals of the prior art, it is an object of the present invention to provide an improved process for the synthesis of urea from ammonia and carbon dioxide or compounds thereof in which the unconverted ammonium carbamate is recovered and returned to the synthesis for further conversion.

Other objects and advantages of the invention will be apparent from the following specification in which the preferred embodiments are described.

According to the present invention the urea synthesis is effected by introducing into a suitable closed reaction vessel ammonia and carbon dioxide, either as such or combined as ammonium carbamate, ammonium carbonate, or ammonium bicarbonate, an excess of ammonia over the stoichiometrical requirement being employed and ammonium carbamate and methanol from a preceding cycle being present to the extent and for the purpose hereinafter more fully set forth and described. The raw materials are submitted to the combined effect of urea-forming temperatures, i. e. from 140–250° C., and the autogenously developed pressure. When the reaction has progressed sufficiently the synthesis melt is subjected to distillation for the recovery of the unconverted ammonium carbamate. This distillation is accomplished, preferably, in three steps, in the first of which the major part (preferably as much as practicable) of the excess ammonia is recovered at suitable pressure, and in the second of which the ammonium carbamate, together with residual excess ammonia, and methanol is removed by distillation and suitable reflux at a lower pressure and conveyed to a condenser to form a slightly under-saturated solution of ammonium carbamate in methanol at about 50° C. The residue of urea and water is conveyed to a urea evaporator wherein it is treated as desired for the production of solid or shotted urea or the like. The slightly under-saturated solution of ammonium carbamate in methanol is returned to the autoclave for further conversion with additional quantities of ammonia and carbon dioxide or their compounds, an excess of ammonia being maintained in the synthesis chamber.

I have found that methanol may be present in the synthesis without affecting the equilibrium point of the reaction and I have discovered, furthermore, that by the use of methanol as above described it is possible to condense the ammonium carbamate so that it may be readily returned to the synthesis.

By operating in the foregoing manner ammonium carbamate unconverted in the synthesis autoclave can be readily recovered and reutilized, with an over-all efficiency and a reduction in production costs not heretofore possible by the known methods. While the invention is applicable to either batch or continuous processes, the synthesis is preferably effected in a continuous manner and it is with reference to a process of this particular kind that the invention is described in the following examples, it being understood that the examples are only by way of illustration and that the invention is not limited to the examples.

*Example 1.*—The reaction is effected in a corrosion and pressure-resistant vessel or autoclave such as is ordinarily used in the synthesis of urea, the same being provided with inlets for the raw materials and outlets for withdrawal of the reaction products. Into this autoclave are introduced initially 82.6 parts by weight of ammonia and 36.3 parts of carbon dioxide, in addition to 13.6 parts of ammonium carbamate and 100 parts of methanol from a previous operation of the cycle. The charge is heated to about 150° under a pressure of about 100 atmospheres and is maintained under these conditions until little further conversion to urea takes place, this requiring a period of about two hours. The synthesis melt is then forced by its own pressure into a primary still in which as the temperature of the melt falls from 150 to 100° substantially all of the excess ammonia is distilled, the distillate being thereafter liquefied, by cooling, and returned to the reaction autoclave. The hot distillation residue, containing urea, unconverted ammonium carbamate, methanol, water, and a small part of the excess ammonia, is transferred to a secondary still where distillation is continued at a temperature of 90–120° C., to remove substantially all of the ammonium carbamate and a major portion of the methanol, together with a small quantity of ammonia which may have come through from the primary still. The methanol not removed in the ammonium carbamate distillation is then taken out by means of an auxiliary still and condenser. The almost saturated solution of ammonium carbamate in methanol, together with small quantities of ammonia, is returned to the autoclave for further conversion with additional quantities of ammonia and carbon dioxide or their compounds, an excess of ammonia being maintained in the synthesis melt.

In a typical operation effected in the foregoing manner the composition of the melt before the primary distillation was approximately,—ammonia 54.5 parts, ammonium carbamate 13.6 parts, urea 49.6 parts, water 14.9 parts, and methanol 100 parts. After the primary distillation the composition was,—2.7 parts ammonia, 13.6 parts ammonium carbamate, 49.6 parts urea, 100 parts methanol, and 14.9 parts water.

When the cycle has been established the relative proportions of fresh and recirculated materials introduced into the reaction autoclave was approximately as follows,—percentages being by weight. Fresh materials: $CO_2$ 15.6%, ammonia 12.1%. Recirculated materials: $CO_2$ (as carbamate) 3.3%, ammonia (as carbamate) 2.6%, ammonia (uncombined) 23.5%, methanol 43%. Under the foregoing conditions the conversion of ammonium carbamate to urea attained in the autoclave is approximately 82.5% per pass, whereas the over-all efficiency of the conversion of the cyclical process approaches as near 100% as the tightness of the system will permit.

*Example 2.*—Into an autoclave such as described in Example 1 I introduce initially 59.5 parts ammonia, 33 parts carbon dioxide, 19.5 parts of ammonium carbamate, and 143 parts methanol, of which 19.5 parts carbamate and 34 parts ammonia are obtained from a previous cycle. The charge is heated to about 150° under a pressure of about 100 atmospheres and is maintained under these conditions until little further conversion to urea would take place, this requiring a period of about two hours. The synthesis melt is then put by its own pressure into a primary still in which as the temperature of the melt falls from 150–100° substantially all of the excess ammonia is distilled, the distillate being thereafter liquefied, by cooling, and returned to the reaction autoclave. The hot distillation residue, containing the urea, unconverted ammonium carbamate, methanol, and water and a small part of the excess ammonia, is transferred to a secondary still where distillation is continued at a temperature of 90–120° C., to remove substantially all of the ammonium carbamate, ammonia (remaining from the primary still operation), and a major portion of the methanol. The methanol not removed in the ammonium carbamate distillation is taken out by means of an auxiliary still and condenser. The remaining urea-water is then transferred to a urea evaporator for the treatment of the urea as desired, while the distilled ammonia, unconverted ammonium carbamate, and methanol are passed back to the urea autoclave for further conversion with additional quantities of ammonia and carbon dioxide or their compounds, an excess of ammonia being maintained in the synthesis melt.

In a typical operation effected in the foregoing manner the composition of the melt before the primary distillation was approximately—ammonia 34.0 parts, urea 45 parts, ammonium carbamate 19.5 parts, water 13.5 parts, and methanol 143 parts. After the primary distillation the composition was—ammonia 1.7 parts, urea 45 parts, ammonium carbamate 19.5 parts, water 13.5 parts, and methanol 143 parts.

When the cycle has been established the relative proportions of fresh and recirculated materials introduced into the reaction autoclave are approximately as follows, percentages being by weight. Fresh materials: $CO_2$ 13%, ammonia 10%. Recirculated materials: $CO_2$ (as carbamate) 4.3%, ammonia (as carbamate) 3.4%, $NH_3$ (uncombined) 13.3%, methanol 56%. Under the foregoing conditions and conversion of ammonium carbamate to urea attained in the autoclave is approximately 75%, whereas the over-all efficiency of conversion of the technical process approaches as near 100% as the tightness of the system will permit.

With reference to the primary distillation of excess ammonia, I have found that where cooling water available for the ammonia liquefaction is not sufficiently cold to effect separation of the desired maximum of ammonia, the distillation is advantageously conducted in two stages, in the first of which substantially all of the ammonia is liquefied merely by cooling, and in the second, compression is employed as an aid to liquefaction.

It will be understood that where reference is made broadly to ammonia and carbon dioxide as raw materials in the appended claims this is to be taken as including the same either as such or in chemical compounds or combination.

Various changes may be made in the method described without departing from the invention or sacrificing any of the advantages thereof.

I claim:

1. The process for the synthesis of urea from ammonia and carbon dioxide which includes the steps of recovering unconverted ammonium carbamate from the synthesis melt by distilling the same, condensing the distillate in the presence of methanol to form a solution of ammonium carbamate and subjecting said solution together with additional ammonia and carbon dioxide to urea-forming temperature and pressure in the presence of a substantial excess of ammonia.

2. The continuous process for the synthesis of urea which comprises subjecting ammonia and carbon dioxide, to urea-forming temperature and pressure while maintaining an excess of free ammonia in the synthesis melt, subjecting the melt to a primary pressure distillation in which at least the major part of the excess ammonia is recovered and thereafter to a secondary distillation at a lower pressure, in which unconverted ammonium carbamate is recovered by condensation in the presence of methanol to form a solution of ammonium carbamate, and submitting said solution, together with ammonia from the primary distillation and fresh ammonia and carbon dioxide, to urea-forming temperature and pressure.

3. The continuous process for the synthesis of urea which comprises subjecting ammonia and carbon dioxide, to urea-forming temperature and pressure while maintaining an excess of free ammonia in the synthesis melt, subjecting the melt to a primary pressure distillation in which at least the major part of the excess ammonia is recovered and thereafter to a secondary distillation at a lower pressure, in which unconverted ammonium carbamate is recovered by condensation in the presence of methanol to form a solution of ammonium carbamate, and submitting said solution, together with ammonia and carbon dioxide, to urea-forming temperature and pressure.

In testimony whereof I affix my signature.

FREDERICK W. MILLER, Jr.